May 10, 1960

D. W. VAN GIESON 2,935,805

TELEPHONE NUMBER INDEXES

Filed May 27, 1959

3 Sheets-Sheet 1

DAVID W. VAN GIESON

*INVENTOR.*

BY William Wolfe

May 10, 1960

D. W. VAN GIESON 2,935,805

TELEPHONE NUMBER INDEXES

Filed May 27, 1959

3 Sheets-Sheet 2

DAVID W. VAN GIESON

INVENTOR.

BY William Wolfe

DAVID W. VAN GIESON
*INVENTOR.*
BY William Wolfe

United States Patent Office 2,935,805
Patented May 10, 1960

2,935,805

TELEPHONE NUMBER INDEXES

David W. Van Gieson, Yonkers, N.Y.

Application May 27, 1959, Serial No. 816,228

5 Claims. (Cl. 40—10.5)

This invention relates to a telephone number index, and more specifically to a type designed to rest under, and in definite relation to, a modern telephone instrument of the cradle handset type.

There is a decided advantage in having a list of frequently-called telephone numbers readily available and close at hand, or at the telephone, when dialing or calling numbers which fall in the frequently-called category. The arrangement makes for efficiency, both in saving time and in promoting accuracy.

Therefore, a major object of the invention is to provide a readily accessible index or directory of frequently-called telephone numbers conveniently positioned, and maintained so, with relation to the telephone instrument.

Another object is to provide a rotatable type of index that, while holding its position with relation to the telephone instrument, can be rotated from a concealed position under the telephone stand to an exposed position adjacent to said telephone stand.

Another object is to provide a rotatable type of index of such compact design as to be inconspicuous when in a position largely of concealment under a telephone instrument.

Another object is to provide a rotatable type of index which is independent of the telephone instrument to the extent that it will not act as a support therefor, and will not be rigidly attached thereto, being loosely linked or attached by means of a round opening in its body encircling the right-hand forward supporting foot of the instrument.

Another object is to provide a type of index that will afford certain protection of the index material against soiling, blurring, effacement, or mutilation through handling.

Another object is to provide a type of index wherein telephone number index sheets are so secured that they can be quickly and easily removed and securely replaced when making changes in listings.

A further object is to provide a functional device with exposed advertising display space, the whole being so designed as to make it economically practical for advertising give-away purposes.

A still further object is to provide a type of telephone number index wherein, as exemplified in the embodiment to be described, the simplicity and economy of construction is such as to employ a single sheet stamping in addition to printed index sheets, a transparent overlay, and simple fastening means.

With the above objects in view, all of which will be apparent from the following description and the accompanying drawings, the invention resides in its novel, compact, and economical construction as hereinafter described and claimed, it being understood that various modifications of the embodiment disclosed may be made within the scope of the appended claims, and that the invention is not limited to the precise arrangements as herein shown and described.

More particularly the invention comprises a frame piece supporting index material and its transparent protective overlay, said frame piece having a contour bounding a rectangular portion and an adjacent portion with extending sides, and being designed to encircle and attach to the right forward supporting foot of a telephone instrument, and to be rotatable about said foot.

For further comprehension of the invention, and of the objects and advantages thereof, reference will be had to the following description, to the accompanying drawings, and to the appended claims in which the various novel features of the invention are more particularly set forth.

In the accompanying description the drawings form a material part of this disclosure:

Figures 1, 2:
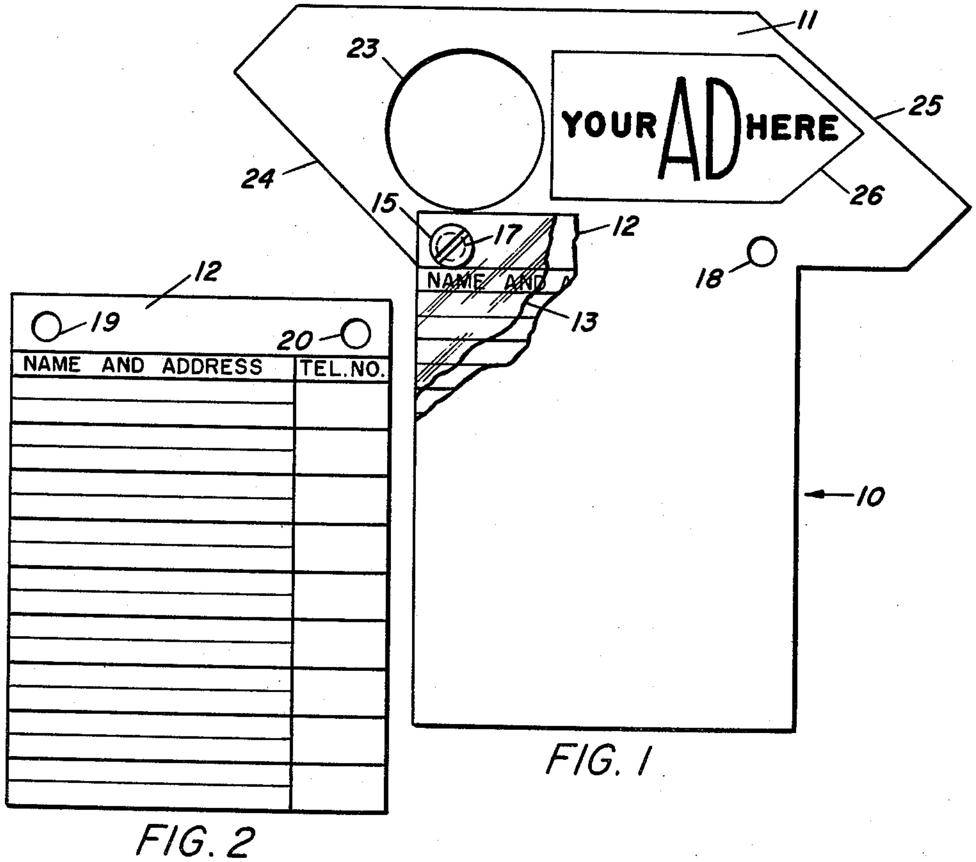
Fig. 1 is a plan view of the assembled index embodying the invention, and showing a frame piece, index material and its transparent protective overlay, and one of the fastening members.
Fig. 2 is a typical printed index sheet.
Figure 3:
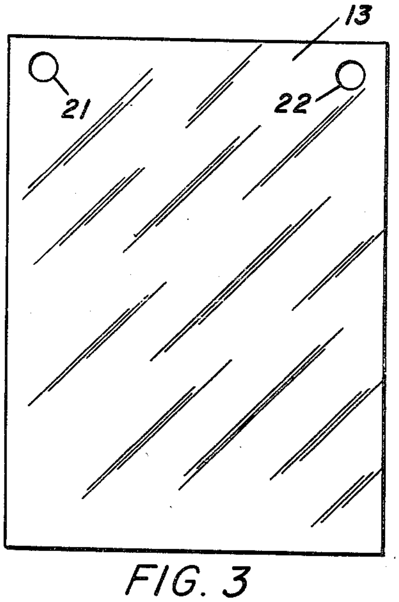
Fig. 3 is a transparent protective overlay.
Figure 4:
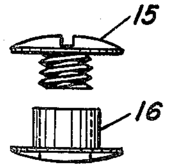
Fig. 4 is an enlarged view giving details of one of the fastening or binding members, said members each comprising a special type of binding-head machine screw and a threaded screw receptacle.

Referring now in detail to the accompanying drawings, Figs. 1–4 depict the various elements comprising the complete device. These elements are as shown in relative position in the assembled device 10, and consist of frame piece 11, index material 12, protective overlay 13, and fastening members comprising binding-head machine screws 15 and coacting threaded screw receptacles 16. Frame piece 11 can be formed of rigid but light-gage sheet plastic, fiber, pressboard, or other suitable material. Index material 12 consists of a plurality of sheets, preferably of bond paper, ruled approximately as shown to accommodate telephone listings, or the names and addresses of parties, and telephone numbers frequently called. Protective overlay 13 may be of light-gage plastic, preferably transparent, or other suitably flexible and preferably transparent material. The fastening members each comprise a binding-head type of machine screw 15 and a threaded screw receptacle 16, or they may be ordinary metal eyelets which are punched into place.

Figures 5, 6, 7:
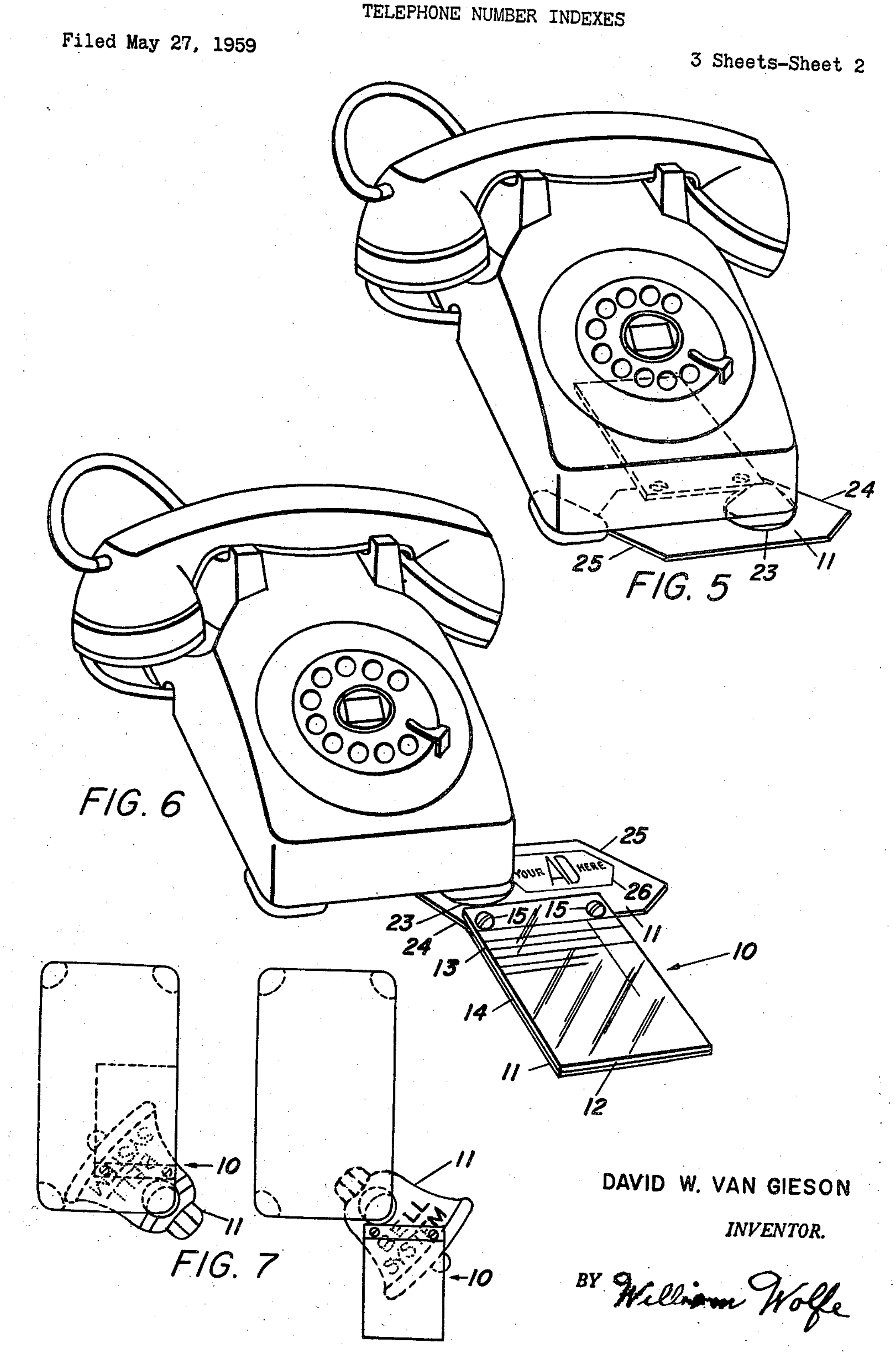
Fig. 5 is a perspective view, partly in phantom, of the index in a partially concealed position under a telephone instrument.
Fig. 6 is a perspective view of the index in an exposed position partially under the telephone instrument.
Fig. 7 is a modification of the index by virtue of changes in the design of its frame piece to suit a particular advertising purpose.

With particular reference to Fig. 1, Fig. 5, and Fig. 6 showing the assembly of the various elements of the device, it should be apparent that index material 12 is placed over frame piece 11, and that protective overlay 13 is placed over index material 12 in such manner that holes 17, 19, and 21 of the three members coincide, and so that holes 18, 20, and 22 of the members also coincide. In these positions all members are compactly fastened together by means of binding-head machine screws 15 which are inserted downwardly through each set of coinciding holes and into threaded screw receptacles 16 on the underside of the assembled elements. If desired, for purposes of economy, but at a sacrifice of the use of refills, the fastening members may be ordinary metal eyelets permanently punched into place.

Frame piece 11 is so designed that, when placed under the telephone stand with its opening 23 loosely encircling the right-hand forward supporting foot of the said telephone stand, it will be maintained in an operable position with relation thereto. See Fig. 5. Frame piece 11 is also designed so that, when in a position largely of concealment under the telephone stand, its edge 24 is exposed and accessible to finger pressure for clockwise rotation of the index device to an exposed position, and its edge 25 is in direct contact with the left-hand forward supporting foot of the telephone stand to restrict counter-clockwise rotation of the device.

For use in connection with a telephone the index device is placed on the surface which supports the telephone stand, and the telephone instrument is placed in position with its right-hand forward supporting foot inserted in, and encircled by, the opening 23 in frame piece 11 of the device, as shown in Figs. 5 and 6. It will be apparent that the index device will move with the telephone stand if any sliding movement is imparted to the stand while resting on a supporting surface.

In operation the index device, when not in use, is maintained in a position largely of concealment under the telephone, as shown in Fig. 5. Sustained finger pressure at exposed edge 24 of frame piece 11 will rotate the index material into full view, making telephone number listings available for easy reference. The index device can be quickly swung back out of sight by finger pressure exerted at left-hand edge 14 of index material 12. With index material fully concealed, the device is restrained from further rotary movement by contact of its edge 25 with left-hand forward supporting foot of the telephone stand.

To renew the index material, binding-head machine screws 15 are unscrewed, permitting the removal of transparent protective overlay 13 and old index material 12. The device can then be re-assembled with new index sheets.

Space 26 is provided on the top surface of frame piece 11 for the accommodation of a trademark, advertising, or other display. See Fig. 6. This space or area is always in view when the index device is in the exposed or reference position. The display matter may be in the form of imprints, decalcomanias, gummed labels, pressure adhesives, or other suitable media.

To suit a particular advertising purpose, and without interfering with its function of permitting rotation of the index device to exposed and concealed positions with relation to the telephone instrument, frame piece 11 may be modified in shape. Fig. 7 illustrates a modification of this kind in which said frame piece is in the form of a bell to symbolize the "Bell Telephone System."

Figure 8:
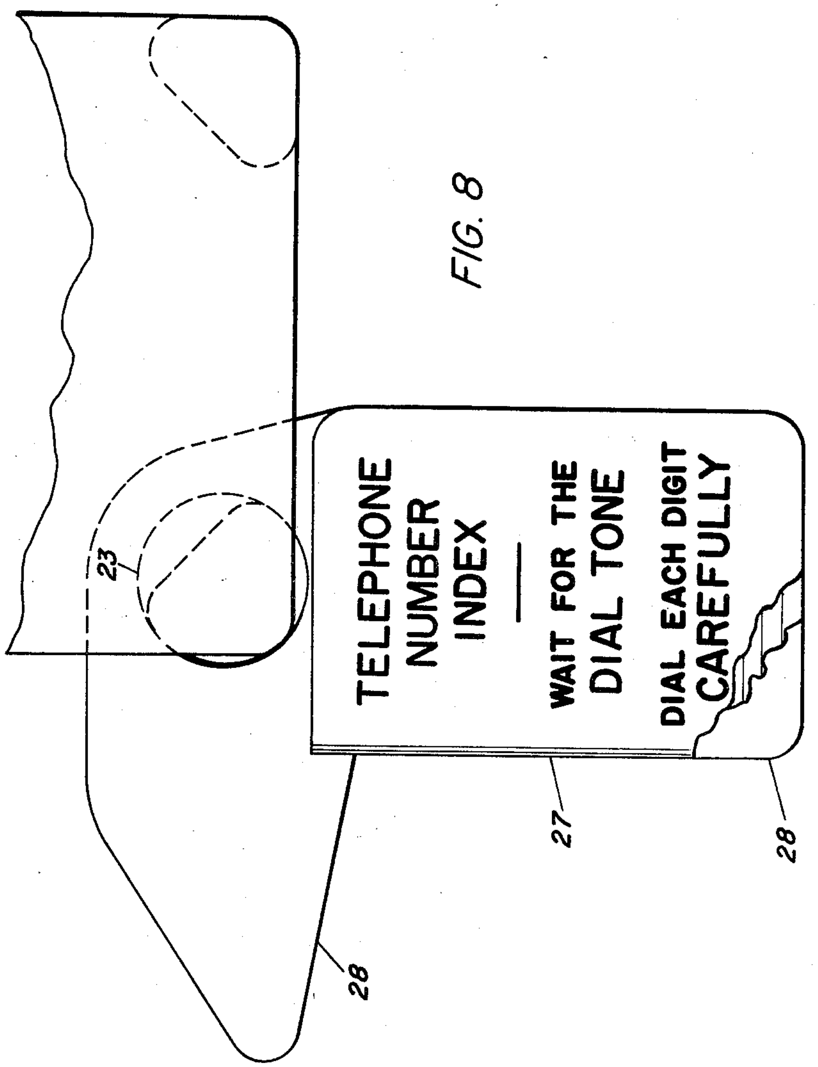
Fig. 8 is a modification of the invention showing a frame piece and an attached booklet.

A further modification of the invention can be made by replacing index material 12 and its transparent protective overlay 13 with a paper booklet 27, printed, ruled, and indexed to accommodate names and telephone numbers. This modification can be easily and simply constructed by cementing the paper booklet 27 to modified frame piece 28 of pressboard or other suitable material, the said frame piece having an opening 23 and a general contour and shape as shown in Fig. 8. As further indicated in Fig. 8, the index device, in this modification, is designed by virtue of opening 23 in modified frame piece 28 for loose attachment to, and rotation about, the left-hand forward supporting foot of the telephone instrument.

It should be understood that while I have illustrated and described the preferred embodiment and several variations of my invention, I do not limit myself to the precise constructions herein disclosed and the right is reserved to all changes and modifications coming within the scope of the invention as defined in any of the appended claims.

Having thus described my invention, what I claim as new and desire to secure by United States Letters Patent is:

1. An index device, suitable for use with a telephone stand having four downwardly projecting rectangularly spaced supporting feet, comprising in combination a frame piece of rigid material, index material consisting of a plurality of ruled index sheets for the accommodation of telephone listings, a protective overlay which is flexible and preferably transparent, and removable fastening members, said frame piece having an opening designed to loosely encircle and engage the right-hand forward supporting foot of the telephone stand, and having an exposed edge adjacent to said opening which is available to finger pressure for manually rotating the said index device from a partially concealed to an exposed or reference position, and another edge at the opposite side of the frame piece to said first edge to contact the left-hand forward foot of the said telephone stand for the restriction of rotary movement of the said index device when swung back by finger pressure to a position largely of concealment under the said telephone stand.

2. A device of the character described in claim 1 wherein said removable fastening members for compactly connecting all components are in the form of binding-head machine screws inserted and passing downwardly through coinciding holes in all components to threaded screw receptacles for binding said index sheets and said protective overlay to said frame piece in looseleaf form.

3. A device of the character described in claim 1 wherein said fastening members for compactly connecting all components are in the form of metal eyelets punched through coinciding holes in all components to bind said index sheets and said protective overlay to said frame piece in a permanent form.

4. An index device suitable for use with a telephone stand having four downwardly projecting rectangularly spaced supporting feet, said device comprising in part a frame piece of rigid material having a contour bounding a rectangular portion and an adjacent portion with extending sides, one extending side being designed to contact the left-hand forward supporting foot of the telephone stand, and the opposite extending side being exposed when said frame piece is in its hidden position under the telephone stand, the said frame piece further having an opening in the portion adjacent to the extending side which is exposed, the said frame piece being operable to rotatably hold the index device to the telephone stand.

5. A frame piece as described in claim 4 wherein the portion having the extending sides has an area between the side edges suitable for containing advertising material and wherein the rectangular portion is suitable for containing a telephone number index.

References Cited in the file of this patent

UNITED STATES PATENTS

| | | |
|---|---|---|
| 2,677,910 | Morgan | May 11, 1954 |
| 2,741,860 | Van Gieson | Apr. 17, 1956 |